3,426,068
CRYSTALLINE 2,2-ALKYLIDENE-BIS(p-BENZAMIDE) INCLUSION COMPOUNDS
Anthony Thomas Coscia, South Norwalk, Conn., assignor to American Cyanamid Company, Stamford, Conn., a corporation of Maine
No Drawing. Continuation-in-part of application Ser. No. 318,067, Oct. 22, 1963. This application July 13, 1966, Ser. No. 564,740
U.S. Cl. 260—558          1 Claim
Int. Cl. C07c *103/24;* C10l *7/02*

This application is a continuation-in-part of my application for United States Letters Patent, Ser. No. 318,067, filed on Oct. 22, 1963, now abandonded, which in turn is a divisional application corresponding to United States Letters Patent, No. 3,114,784, issued on Dec. 17, 1963.

This invention relates to a novel class of crystalline benzamide inclusion compounds or adducts. More particularly, it relates to novel crystalline adducts comprising 2,2-alkylidene bis-benzamides represented by the following formula:

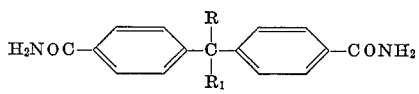

in which R and $R_1$ are alkyl groups containing from 1 to 2 carbon atoms, and to process for utilizing 2,2-alkylidene bis-benzamides to include therein hydrocarbons or halogenated hydrocarbons thereby forming crystalline inclusion compounds or adducts.

It has been unexepectedly found that the above-defined bis-benzamide can selectively form inclusion or adduct compounds with a variety of compounds or mixtures, finding utility, for instance, as solid fuels. The bis-amides are also useful in effecting the separation of isomeric hydrocarbon mixtures.

According to the present invention, the bis-benzamides employed herein may be conveniently and readily prepared by reacting either a 2,2-alkylidene-bis (benzoic acid) or the corresponding acid halide with at least two mols of ammonia gas per mol of the acid or acid halide in any suitable reaction vessel. As illustrative of the bis compounds useful herein may be mentioned 2,2-propylidene-bis (p-benzoic acid), 2,2-butylidene-bis (p-benzoic acid), 2,2-pentylidene-bis (p-benzoic acid) and 2,2-butylidene-bis (p-benzoyl chloride).

In general, conversion of the bis-benzoic acids to the corresponding bis-amides which are white to tan solids is carried out in an autoclave at elevated temperatures ranging from about 200° C. to about 290° C. Under such conditions of temperature and pressure, the reaction is completed within about five hours or less. Usually, one or two hours are required for complete reaction. However, if the reaction is carried out in a vessel at atmospheric pressure, the time for reaction is substantially increased, usually twenty-four hours or longer.

Tempreatures, usually in the range of from 20° C. to 30° C., are employed when reacting the acid chlorides of bis-benzoic acids. Usually, the reaction is completed within two hours in the absence of polar solvents. However, in their presence, the reaction is almost instantaneous.

Advantageously, the bis-amides as defined above can readily form inclusion compounds or adducts with a wide variety of diverse molecules. Such compounds are characterized as comprising and including the host molecule, that is, the bis-amide, and a guest molecule, such as a hydrocarbon or halogenated hydrocarbon in the form of a liquid or a gas. The host molecule readily takes up or includes the guest molecule. For instance, the inclusion compounds of the present invention may be formed in a straightforward manner by admixing the defined bis-amide with a guest compound, such as benzene or xylene. Alternatively, the inclusion compound may be formed by initially dissolving the bis-benzamide in a polar solvent, such as methanol, ethanol or acetone, introducing and admixing the guest compound, crystallizing, and, finally, separating the so-formed inclusion compound from the solution. Where isomeric mixtures of hydrocarbons are employed, such as, for example, ortho- meta- and para-xylenes, it is noted that effective separation of the hydrocarbon mixture is obtained due primarily to the inclusion of the ortho and meta isomers in the host bis-amide molecule to the substantial exclusion of the para isomer.

The invention will be further defined by the following examples which are to be taken as illustrative only, and are not to be construed as being limitative. All parts are by weight, unless otherwise stated.

EXAMPLE 1

Preparation of 2,2-butylidene-bis (p-benzamide)

57 parts of 2,2-butylidene-bis (p-benzoic acid) are charged to an autoclave provided with an inlet and an outlet port. Through the inlet port are introduced 25 parts of anhydrous ammonia gas and resultant mixture is heated for one hour at 225° C. The autoclave is then vented and permitted to cool. A quantitative yield of the bis-amide is recovered as tan powder melting at about 110° C.

The product is insoluble in water but soluble in methanol, ethanol and in boiling acetone. Further, its infrared (IR) spectra demonstrate the presence of diamides due to the absorption bands at 3350 cm.$^{-1}$ and 3200 cm.$^{-1}$ for amino groups and carbonyl group (C=O) at 1655 cm.$^{-1}$.

EXAMPLE 2

Preparation of 2,2-pentylidene-bis (p-benzamide)

Repeating the procedure of Example 1 in every material respect except that 2,2-pentylidene-bis (p-benzoic acid) is substituted for butylidene-bis (benzoic acid) and the reactants are heated in an autoclave for two hours. Quantitative yields of 2,2-pentylidene-bis (p-benzamide) are obtained, softening at 104° C. to 124° C.

EXAMPLE 3

Preparation of 2,2-proylidene-bis (p-benzamide)

The procedure of Example 1 is repeated in every detail except that the butylidene-bis (benzoic acid) is replaced by 2,2-propylidene-bis (p-benzoic acid) and the reactants are heated for about two hours. 2,2-propylidene-bis (p-benzamide), melting at 105° C. to 110° C., is recovered in quantitative yields.

EXAMPLE 4

Preparation of 2,2-butylidene-bis (p-benzamide)

To a solution containing 5 parts of 2,2-butylidene-bis (p-benzoic acid chloride) in 60 parts of cold absolute alcohol are added with mild stirring 80 parts of ice-cooled absolute ethanol saturated with anhydrous ammonia. The mixture is permitted to stand undisturbed for twenty-four hours. Resultant ammonium chloride is filtered and removed from the solution. The alcohol is next distilled and a residual syrup is obtained. Trituration with methanol and drying under a reduced pressure of about 1 mm. Hg gives the butylidene-bis (p-benzamide) as a white amorphous solid in high yields. The product melts at about 110° C.

EXAMPLE 5

Preparation of 2,2-butylidene-bis (p-benzamide)

To a solution of 5.5 parts of 2,2-butylidene-bis (p-benzonitrile) in 60 parts of ethyl alcohol there are added 25 parts of 30% aqueous hydrogen peroxide solution. 3.2 parts of a 3 N aqueous solution of sodium hydroxide are added slowly thereto and the resultant solution is heated to 45° C. to 50° C. for about five hours. On neutralization with dilute sulfuric acid, a white precipitate of 2,2-butylidene-bis (p-benzamide) is noted. When the latter is washed with water and dried over potassium carbonate, an 85 percent yield of white bis-amide, melting at 105° C. to 109° C., is obtained.

The following examples will illustrate the utilization of the several alkylidene bis-amides both in preparing crystalline inclusion compounds and effecting the separation of isomeric hydrocarbons or halogenated hydrocarbons selectively.

EXAMPLE 6

To a solution containing 1 part of 2,2-butylidene bis-benzamide, prepared by the process of Example 1 above, and 15 parts of ethyl alcohol, there are added thereto 4 parts of a mixture of xylene isomers having the following composition:

|  | B.P. in ° C. |
|---|---|
| Meta xylene, 40% | 139.1 |
| Para xylene, 30% | 138.5 |
| Ortho xylene, 30% | 144.4 |

The above mixture is then heated to about 100° C. for about ten minutes. Resultant solution is next cooled to about 25° C. Crystals separated from the solution are collected. After drying again at 70° C. and 0.2 mm. Hg pressure for three hours, recovered crystals melted at 132° C. to 140° C.

Heating the aforementioned crystalline product in the high vacuum of a mass spectrometer and analyzing its IR spectrum, it is observed that the host compound [2,2-butylidene - bis (p - benzamide)] contains the following composition:

|  | Percent |
|---|---|
| Meta xylene | 30 |
| Para xylene | <5 |
| Ortho xylene | 70 |

Replacing the butylidene bis-benzamide with either the propylidene or the pentylidene bis-benzamide as prepared in Examples 2 and 3 above to treat the isomers in the above example, separation of those isomers is similarly accomplished.

EXAMPLE 7

Repeating Example 6 above in every detail except that 2,2 - butylidene - bis (benzamide) is replaced by 2,2-butylidene-bis (p-benzoic acid). No inclusion and, therefore, no separation of the several isomers occurs.

EXAMPLE 8

To 7 parts of 2,2-butylidene-bis (p-benzamide) is added sufficient ethyl alcohol in a suitable reaction vessel and the mixture is then heated to 80° C. A 1:1 mixture of o-bromotoluene and p-bromotoluene having boiling points of 182° C. and 184° C., respectively, is next added to the aforementioned hot solution. Upon cooling to room temperature, a crystalline mass of the bis-amide separates in quantitative yields.

Analysis of the crystals above-prepared when employing infra-red spectroscopy indicates that 75 to 85 percent of the ortho isomer had been included in the bis-amide host compound and that but 15 to 25 percent of the para isomer are accommodated by the same bis-amide. The latter ortho and bromo-toluenes are next separated from the crystals of the bis-amide by heating the latter to about 150° C. under 10 mm. Hg pressure.

EXAMPLE 9

In a suitable reaction vessel are added 1 part of 2,2-butylidene-bis (p-benzamide) and 15 parts of ethanol to dissolve the latter. To the mixture is next added sufficient petroleum ether having the following composition to bring about a turbidity in the solution:

|  | B.P. in ° C. |
|---|---|
| 2-methylpentane, 21% | 60 |
| n-Pentane, 48% | 39 |
| 2-methylbutane, 15% | 28 |
| 1-pentene, 12% | 30 |

The mixture is brought briefly to the boiling point and is immediately filtered. Upon cooling of the filtrate, separation of crystals occurs. Resultant crystals are dried at 65° C. for 4 hours in vacuo at 0.2 mm. Hg. pressure. The latter can be employed as a solid fuel.

On analysis, crystals of the inclusion compounds so-formed melt at 125° C.–137° C. with gas evolution and utilizing a mass spectrometer, the volatiles liberated possessed the following composition:

|  | Percent |
|---|---|
| 2-methylpentane | 19 |
| n-Pentane | 13 |
| 2-methylbutane | 35 |
| 1-pentene | 18 |

There is obtained substantial separation of the linear component, n-pentane, from the so-treated petroleum ether.

EXAMPLE 10

As in Example 9 above, there is heated 2,2-butylidene-bis (p-benzamide) dissolved in methanol and 50 parts of chloroform. The mixture is cooled and a crystalline mass separated. The crystals are collected and dried at 45° C. for 15 hours at 0.1 mm. Hg.

Infrared analysis indicates the presence of chloroform and the bis-amide. Further, microanalyses on the sample shows that 15% chlorine is present. The theoretical chlorine analysis for 1 mole of chloroform combined with 2 mols of the bis-amide is 14.97%.

Repeating the procedure of Example 10 in every detail except that in lieu of chloroform, ethyl acrylate, benzene, styrene and decyl mercaptan are added, and each of the latter are separated from the alcoholic solution as a crystalline inclusion compound.

EXAMPLE 11

2,2-propylidene-bis (p-benzamide) is dissolved hot in 15 parts of methanol and 4 parts of benzene are added to the hot solution. Upon slight cooling, crystals are separated and collected. After drying at 65° C. and 0.5 mm. Hg for 3 hours, infrared examination indicates the presence of benzene along with the bis-benzamide.

EXAMPLE 12

2,2-pentylidene-bis (p-benzamide) is treated as in Example 11 except that the aromatic added is xylene. The inclusion compound is collected and dried at 60° C. and 0.2 mm. Hg for 2 hours. Infrared examination indicates the presence of xylene in the crystal along with the bis-amide.

I claim:
1. The inclusion compound: crystalline 2,2-butylidene-bis (p-benzamide)chloroform having a molecular configuration in which one mole of chloroform is combined with two moles of said bis-amide.

(References on following page)

References Cited

UNITED STATES PATENTS 2,713,594  7/1955  Sauer _____ 260—558

OTHER REFERENCES

Heygand Organisch, Chemische Experimentier Runsh, 2nd ed., 1948, pp. 85–90.

HENRY R. JILES, *Primary Examiner.*

NATALIE TROUSOF, *Assistant Examiner.*

U.S. Cl. X.R.

44—7; 260—674, 676, 544, 650, 515